US007169053B2

(12) United States Patent
Moik

(10) Patent No.: US 7,169,053 B2
(45) Date of Patent: Jan. 30, 2007

(54) CENTRALIZED SMART CARD MONEY MANAGEMENT

(75) Inventor: Heribert Moik, Graz (AT)

(73) Assignee: Atronic International GmbH (AT)

( * ) Notice: Subject to any disclaimer, the term of this patent is extended or adjusted under 35 U.S.C. 154(b) by 534 days.

(21) Appl. No.: 10/287,931

(22) Filed: Nov. 4, 2002

(65) Prior Publication Data

US 2003/0134680 A1 Jul. 17, 2003

Related U.S. Application Data

(60) Provisional application No. 60/347,866, filed on Jan. 15, 2002.

(51) Int. Cl.
*A63F 13/00* (2006.01)

(52) U.S. Cl. ............................ 463/43; 463/42; 463/25

(58) Field of Classification Search ................. 463/43, 463/25, 29, 11
See application file for complete search history.

(56) References Cited

U.S. PATENT DOCUMENTS

| | | | | |
|---|---|---|---|---|
| 5,902,983 | A * | 5/1999 | Crevelt et al. | 235/380 |
| 6,547,131 | B1 * | 4/2003 | Foodman et al. | 235/380 |
| 6,577,733 | B1 * | 6/2003 | Charrin | 380/251 |
| 6,746,330 | B2 * | 6/2004 | Cannon | 463/25 |
| 6,866,586 | B2 * | 3/2005 | Oberberger et al. | 463/42 |
| 6,916,244 | B2 * | 7/2005 | Gatto et al. | 463/25 |
| 6,932,704 | B2 * | 8/2005 | Walker et al. | 463/25 |
| 6,969,320 | B2 * | 11/2005 | Lind et al. | 463/25 |
| 7,004,837 | B1 * | 2/2006 | Crowder et al. | 463/25 |
| 2001/0014885 | A1 * | 8/2001 | Yanagi | 705/65 |
| 2001/0034719 | A1 * | 10/2001 | Durand et al. | 705/65 |

* cited by examiner

*Primary Examiner*—Xuan M. Thai
*Assistant Examiner*—Alex Epshteyn
(74) *Attorney, Agent, or Firm*—Patent Law Group LLP; Brian D. Ogonowsky

(57) ABSTRACT

Gaming machines connected to a network each have a smart card reader and an internal memory for receiving electronic tokens downloaded from the smart cards. In a secure room of a casino, there are a number of card readers containing smart cards having an appropriate memory size. These external card readers are connected to the various gaming machines via the network to provide secure financial transactions over the network. Whenever the electronic token balance of a gaming machine's internal memory exceeds a configurable upper limit, the balance is automatically reduced to a default level by the gaming machine transferring the excess money to an idle external smart card. Whenever the electronic token balance of a gaming machine's internal memory falls below a configurable lower limit, the balance is automatically increased to a default level by the gaming machine transferring the money from an idle external smart card.

21 Claims, 3 Drawing Sheets

CENTRALIZED SMART CARD MONEY MANAGEMENT

CROSS-REFERENCE TO RELATED APPLICATIONS

This application is based on a provisional application, Ser. No. 60/347,866, filed Jan. 15, 2002.

FIELD OF THE INVENTION

This invention is related to gaming machines and, in particular, to a technique used to manage electronic tokens in gaming machines where smart cards are used instead of cash.

BACKGROUND

Smart cards are used instead of the payment of bills or coins and are becoming increasingly popular for purchases. The configuration of a smart card is dictated by various standards set by the International Standards Organization (ISO). FIG. 1 is an exploded view of a smart card, consisting of a plastic card 10, a plastic support 11, a glue layer 12, a microcontroller 13, and a printed circuit 14 providing contacts for the leads of the microcontroller. The contacts of the printed circuit 14 contact electrodes in a smart card reader, and circuitry within the smart card reader communicates with microcontroller 13. Microcontroller 13 accesses memory on the chip containing identity information as well as monetary information. Typically, a user provides cash to an institution which, in return, downloads monetary units to the memory of the smart card. When the user desires to make a purchase, the user inserts the smart card into a card reader and enters a personal identification number (PIN). The card reader then deducts the appropriate monetary units from the memory in the smart card.

Cashless gaming is gaining popularity in casinos due to the simplicity and financial benefit of eliminating the need for cash when playing gaming machines. One form of cashless gaming uses a smart card that the player inserts into the gaming machine, such as a slot machine, to download credits (electronic tokens) from the smart card into the gaming machine. After playing, any credits in the gaming machine are transferred to the smart card.

In one such cashless gaming scenario, the casino provides its own smart cards having a unique key to enable the smart card to only be used within that casino. The player inserts money into a smart card dispenser, or the player gives money to a casino cashier, and a smart card is provided to the player with that money stored in the smart card's memory as electronic tokens.

In one type of cashless gaming machine, electronic tokens from the player's smart card inserted into a card reader of the gaming machine are transferred to another smart card, called a Secure Application Module (SAM), within the gaming machine. The SAM can only be removed by authorized casino personnel gaining access to the inside of the gaming machine. The gaming machine uses the SAM as a temporary purse to store all credit transactions during play of the game. When cashing out, the credits are transferred from the SAM to the player's smart card, and the smart card is ejected from the machine.

There are several shortcomings of SAM handling:

1. The SAM's purse must be preloaded with a certain value before it is locked up within the gaming machine. That means, over a certain period of time, there are SAMs with electronic money in an unsecured environment. A person with knowledge of smart card technology can use a SAM to illegally transfer money from the SAM to a user's smart card.

2. When there is much gaming activity, the SAM inside the gaming machine may become empty or full. In this case, no further electronic money transfer is possible until the SAM is physically replaced by a new one with a preloaded value.

3. The amount of electronic money on the SAM can be considered as a potential risk of financial loss in case of theft.

4. The casino is unable to use the money stored in a SAM within a gaming machine for supporting other gaming machines, resulting in an inefficient distribution of the money.

SUMMARY

The present invention is a method to overcome the above drawbacks by providing a form of central bank for all SAMs installed in gaming machines connected to a network. In a secure room of a casino, there are a number of Super SAMs that are smart cards having an appropriate memory size. The Super SAMs are connected via a network to the various cashless gaming machines to provide secure financial transactions over the network.

Whenever a SAM's purse balance exceeds a configurable upper limit, the purse balance is automatically reduced to a default level by the SAM transferring the excess money to an idle Super SAM. Whenever a SAM's purse balance falls below a configurable lower limit, the purse is filled to the default level by transferring electronic money from a Super SAM to the SAM.

The advantages of such a system include the following:

1. Initially, a SAM installed in a gaming machine can be empty. When the SAM is first connected to the network, it gets its initial fill automatically by a download of electronic money from the Super SAM. Therefore, there is no risk of loaded SAMs being in an unsecured environment.

2. Since the amount of money on the SAMs can be held around a default level, the risk of full or empty SAMs inhibiting electronic money transfer is eliminated.

3. A SAM can always be reused, no matter how much activity the gaming machine sees, because it is periodically rebalanced to the default level.

4. Since the risk of empty SAMs is eliminated, the amount of electronic money on the SAM can be fairly low so that the financial loss in case of theft is minimized.

5. Since no SAMs have excess money, the money is efficiently distributed to all the gaming machines on the network.

DETAILED DESCRIPTION

Figure 2:
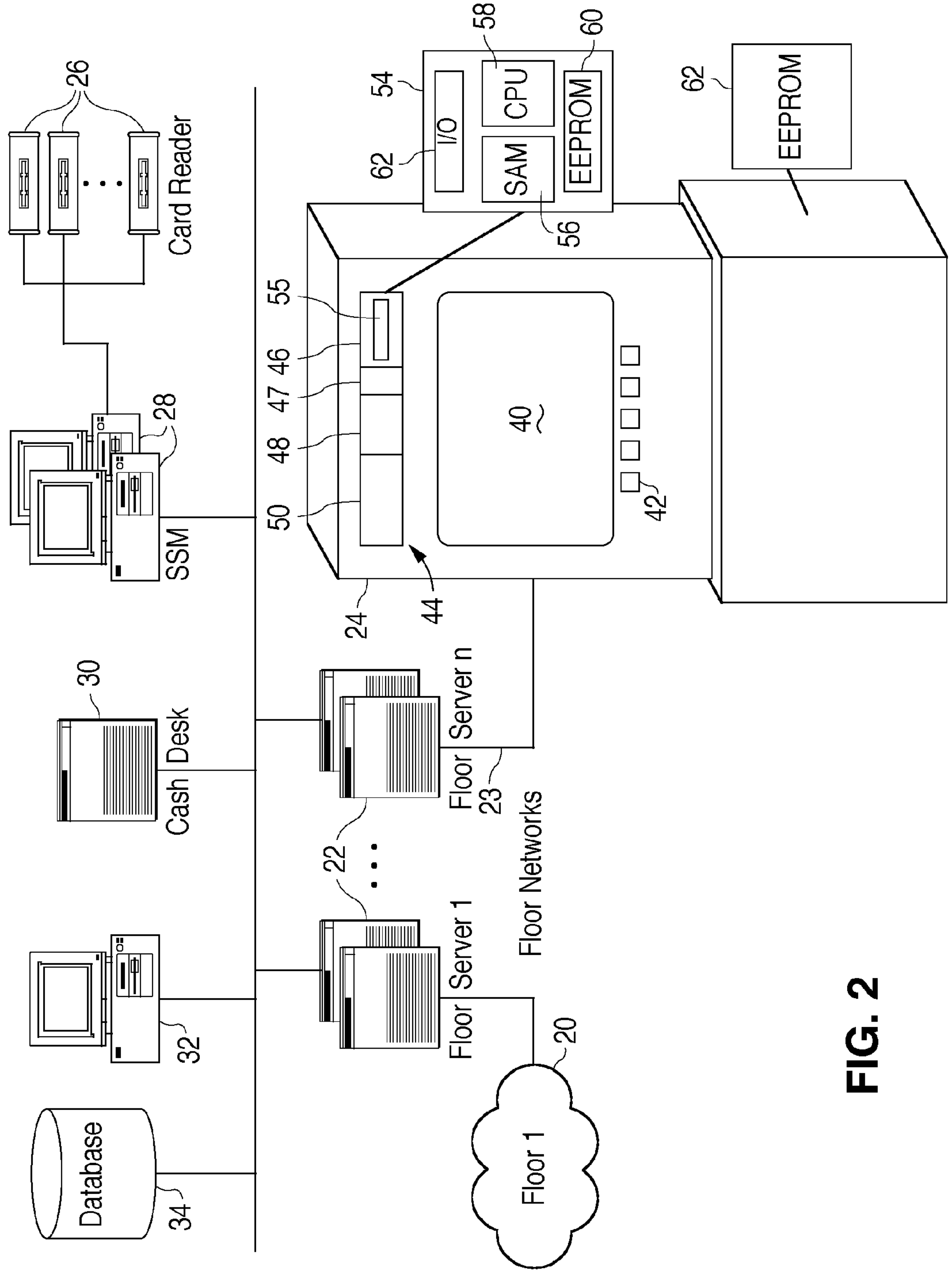
FIG. 2 illustrates gaming machines connected to a network for transferring financial information between the gaming machines' SAMs and the external Super SAMs.

FIG. 2 illustrates a network of gaming machines connected to external processing equipment. In FIG. 2, groups of gaming machines 20 communicate to associated floor servers 22 via any conventional communication technique, such as via an Ethernet. Suitable communication boards are installed in the floor servers 22 and the various gaming machines to transmit and receive signals via wires 23. Multiplexers and other conventional equipment may be used where appropriate to connect a group of gaming machines to a floor server. The preferred configuration depends on the particular layout of the gaming machines. Such communication techniques are conventional in casinos and need not be described herein.

A single gaming machine 24 is shown in the abstract representing any of the plurality of gaming machines 20 connected to the network.

Super SAM card readers 26 each retain a Super SAM card that communicates with one or more computers 28 running Super SAM Coordinator (SSC) software used to transfer data via the network. In one embodiment, three Super SAM card readers 26 support 500 gaming machines. A Super SAM card may be ejected from a card reader 26 by pressing an eject request button.

In one embodiment, the Super SAM card readers 26 are connected to the SSC using a private Super SAM network using a TCP/IP Ethernet connection, with an extra network card built into the SSC computer 28. Within this network, the SSC will act as a BOOTP server assigning IP addresses to the card readers 26. Any type of communications may be used to communicate with the card readers 26, such as serial lines.

Events monitored by the card readers 26 include insertion and removal of a Super SAM card, communications errors with the card reader, and loss of connection to the SSC.

It is possible to connect any quantity of Super SAMs to the network by providing additional card readers 26. Any industry-standard smart card reader can be used.

The SSC software running on a computer 28 in the back-office area of the casino coordinates the transfers between the SAMs and the Super SAMs. Its main task is, upon request, to transfer money to the SAMs in the gaming machines on the network when they run low on money and to remove money from the SAMs when they hold money in excess of a certain limit (to be described below). In one configuration, it is the task of each gaming machine holding a SAM to compare the amount of money in the SAM to upper and lower limits and send money transfer requests to the SSC accordingly. Another alternative is for the SSC to initiate a query of the gaming machines having the SAMs, such as by using conventional polling. The SSC itself does not hold any money or keys, rather it uses the Super SAM cards for this purpose.

As the Super SAM cards must be protected from unauthorized access, the SSC module should run within an environment that ensures proper security, such as a locked and supervised room. The same holds true for the location of the Super SAM card readers 26.

The SSC also has server process capability. A client computer 32 can connect to the SSC to get messages about SSC events like card insertions and ejections, Super SAM purse information, etc. Computer 32 may access a data base to store this data for auditing purposes. Through the client computer 32, there is also a set of commands available that can be issued to the SSC. These include the possibility to reject a certain Super SAM card.

A cash desk terminal 30 is used by casino personnel to load the players' smart cards with electronic tokens. A self-service terminal may also be used to transfer electronic tokens to a player's smart card. The cash desk terminal 30 and self-service terminal contain a SAM, which is handled by the SSC like a SAM in a gaming machine wherein funds are transferred between the SAM and the Super SAMs, as described in detail below.

In one embodiment, all the money initially stored on all the players' smart cards and the gaming machines' SAMs is downloaded from the Super SAMs after the Super SAMs have been first filled to a certain level by the casino. For example, all money given by the player to casino personnel, or inserted into a smart card dispenser, may then be transferred via the network as electronic tokens to the Super SAMs in the card readers 26. Accordingly, the only location where electronic tokens are brought into the smart card cycle is through loading the Super SAMs stored in the card readers 26. The Super SAMs are conventional smart cards. The loading of the Super SAMs with electronic tokens may be by conventional techniques involving encryption keys. The Super SAMs can be loaded with electronic tokens by preloading the Super SAMs during their manufacture or loaded by the casino using secure software that knows the smart card keys necessary to credit/debit the Super SAMs. It will be assumed that the Super SAMs in the card readers 26 contain sufficient electronic tokens to carry out the processes described herein.

Various terminals throughout the casino may be used to read the players' smart cards and provide the players cash.

The money stored on any of the smart cards (including the players' smart cards, the SAMs, and the Super SAMs) will be referred to as electronic tokens.

The gaming machine 24 in FIG. 2 can be a conventional slot machine augmented with the smart card interface described herein. Machine 24 is shown as a video-type gaming machine; however, the invention may be used with gaming machines having motor-driven reels or displaying any other type of game. A video screen 40 displays virtual rotating reels having symbols thereon or any other type of game. In one of the most popular games, an array of randomly selected symbols appears on screen 40, and awards are granted to the player for various symbol combinations across one or more pay lines. Player-controlled buttons 42 allow the player to command machine 24 to, for example, place a bet, start the reels, cash out, draw cards, deal cards, or convey any other command suitable to the particular game being played.

Figure 1:
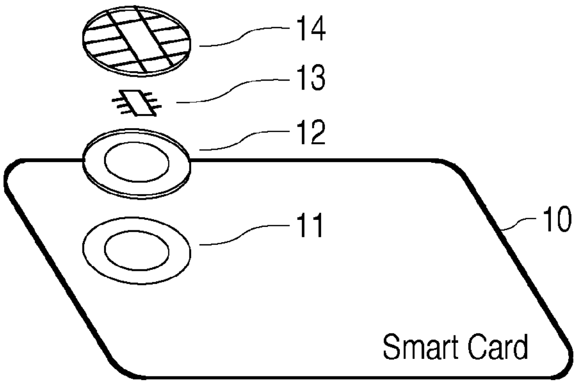
FIG. 1 (PRIOR ART)
FIG. 1 is an exploded view of a conventional smart card.

A player interface module 44 includes a smart card reader 46, a speaker 47, a keyboard 48, a display 50 for instructions and other information, and a machine data controller (MDC) 54. The smart card reader 46 includes a slot 55 through which the player inserts a conventional smart card, such as that shown in FIG. 1.

MDC 54 communicates with the gaming machine and the network through appropriate protocols. MDC 54 performs the following tasks:

Runs accounting, player tracking, and cashless applications;

Communicates with the floor server;

Interfaces to the different types of gaming machines;

Sends out exception messages for each event happening on the gaming machine or player interface module;

Controls the player interface module (i.e., card reader, speaker, keypad, display);

Communicates with additional devices like door switches and in-machine displays;

Stores all gaming machine meter amounts (including the current credit meter amount) in EEPROM 60;

Stores exception messages until acknowledged by the floor server;

Communicates with the players' smart cards; and

Enables the transaction flow between the smart cards and the SAMs.

MDC 54 is operated by firmware that can be downloaded through the floor network.

MDC 54 includes a SAM 56, which is a smart card inserted into a receptacle on MDC 54 that electronically communicates through the network via MDC 54. A CPU 58 and EEPROM 60 are also connected in the MDC 54. EEPROM 60 stores information about the gaming machine 24. Input/Output unit 62 is a conventional port used for communicating via an Ethernet. CPU 58 controls the data communications between I/O unit 62, SAM 56, EEPROM 60, and the network. The various means of packetizing data, unpacketizing data, parsing data, and communicating serial data via the Ethernet is well known and need not be described herein. SAM 56 includes not only memory for storing electronic tokens but processing circuitry for encrypted/decrypting data and other well-known circuitry used in conventional smart cards. Details of smart card technology may be easily obtained from public sources and need not be described herein.

Figure 3:
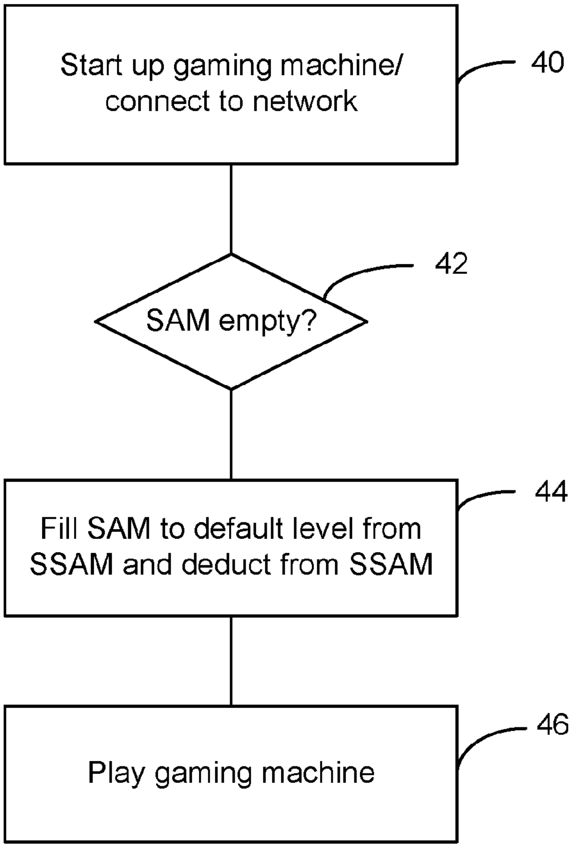
FIG. 3 is a flow chart of a startup routine relating to the initial transfer of electronic tokens to a SAM within a gaming machine.

FIG. 3 illustrates steps in a startup process when first connecting a gaming machine to the network.

In step 40, a gaming machine is initially installed at its location in the casino and electrically connected to the network by, for example, connecting an Ethernet plug to a suitable socket in the gaming machine. At this time, various handshaking functions occur via MDC 54 to identify the location of the machine, using the location code stored in the base socket EEPROM 62 (FIG. 2), as well as communicate the unique gaming machine ID code stored in EEPROM 60 to the casino's central server. The base socket EEPROM 62 is permanently installed in the base on which the gaming machine sits.

In step 42, pursuant to a startup sequence stored in a conventional ROM on MDC 54 and carried out by CPU 58, the empty status of SAM 56 is conveyed to the SSC running on computers 28. In response, the SSC identifies a particular Super SAM in one of the card readers 26 from which to transfer electronic tokens to SAM 56.

In step 44, a conventional electronic token transfer technique is then used to transfer a predetermined number of electronic tokens from the identified Super SAM, through the network, and to SAM 56 in the gaming machine 24. SAM 56 is filled to a configurable default level. In one embodiment, the default level of SAM 56 is equal to the average amount in a conventional coin-operated slot machine hopper. Therefore, the risk of a stolen SAM is approximately the same as the risk of the money in a conventional hopper being stolen. In another embodiment, the default level of SAM 56 is halfway between the upper limit and the lower limit.

In one embodiment, for a request to transfer money from a Super SAM to a SAM, the SSC selects from all idle Super SAMs the Super SAM which, after fulfilling the transfer request, comes closest to 35% of its capacity. The Super SAM must also have the same currency and the same key system (for encryption/decryption) as the requesting SAM. Of course, other algorithms may be used.

Prior to performing the transaction, the SSC checks the chosen Super SAM for any illegal removal or exchanges by reading its serial number. To detect unauthorized manipulation of Super SAM cards, the Super SAMs' contents are periodically read (i.e., serial number, purse contents, currency, and key system identifiers). The read information is verified against the values previously known by the SSC. If the SSC detects a mismatch, the Super SAM card is ejected. The time between the periodic readings is a configurable value, such as 30 seconds. Anytime a Super SAM card is ejected because of the suspicion of being manipulated, an entry is written to an error file.

The transfer between smart cards (e.g., a Super SAM to a SAM) is very secure (e.g., triple DES). Therefore, the download can be done through any network architecture and protocol.

In step 46, the gaming machine is now ready for play.

Figure 4:
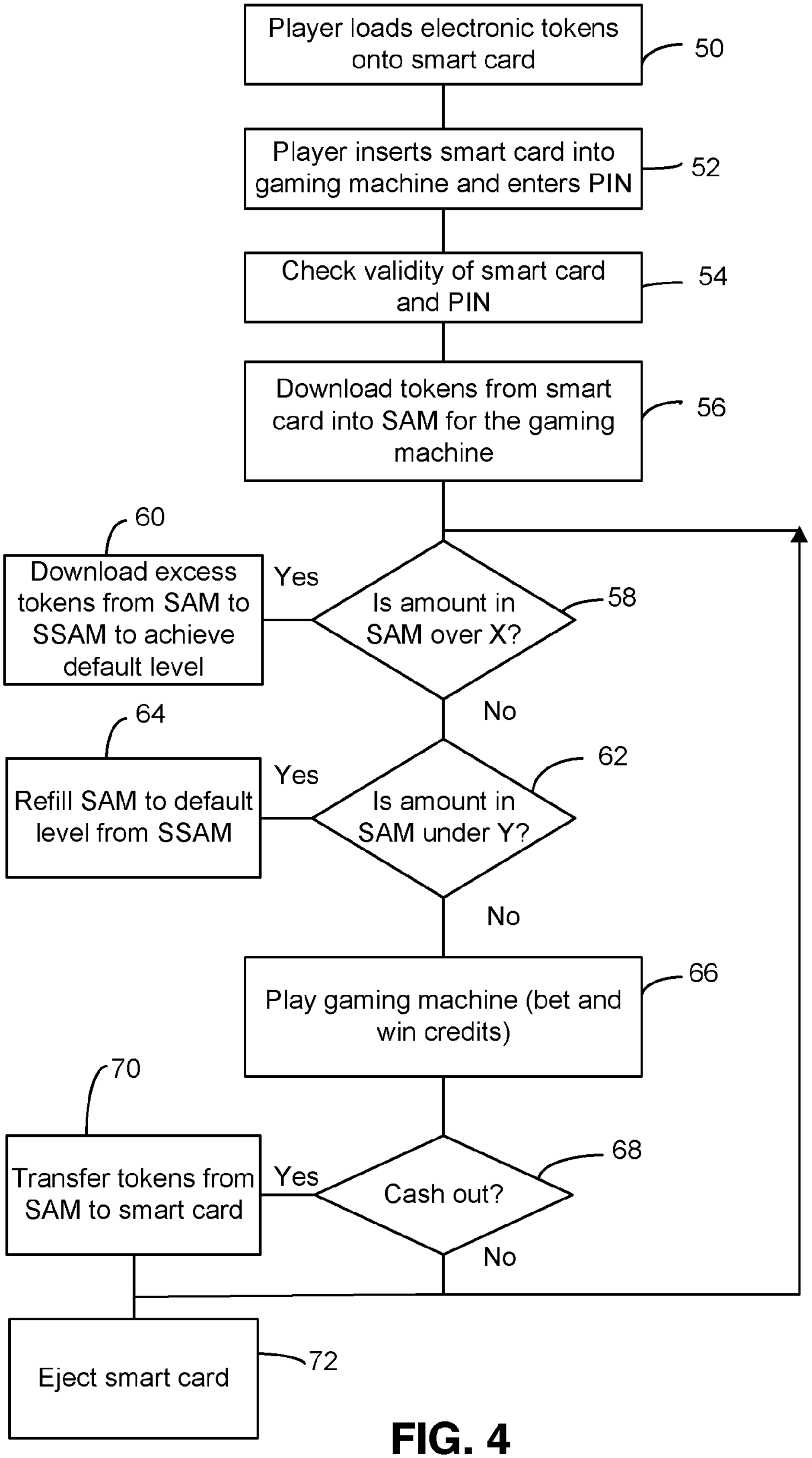
FIG. 4 is a flow chart of a scenario for transferring electronic tokens from a player's smart card to the SAM and for transferring electronic tokens between the SAM and the Super SAM.

FIG. 4 illustrates a process in which the player uses the player's smart card in order to download electronic tokens to the gaming machine and receive electronic tokens on the card when cashing out.

In step 50 of FIG. 4, a player obtains from the casino a smart card having an amount of money encoded into the memory of the card. The player may obtain the card at a cashier's terminal or at a self-service terminal. In all cases, the electronic tokens are loaded from a SAM to the player's smart card. The player may be assigned a PIN at this time, and information about the player may be stored on the card. Loading electronic tokens on the card requires a conventional encryption algorithm using secret keys stored on the card and the SAM. Using the cross-stored keys, these two smart cards negotiate the transfer of the requested amount. After the transfer of electronic tokens from the terminal's SAM to the player's smart card, the SAM is balanced by the SSC like any other SAM in the system.

In another embodiment, conventional smart cards issued by other than the casino may be used.

In one embodiment, the gaming machines accept bills and smart cards but do not dispense cash or physical tokens. Although the player may insert cash into the gaming machine, the player only receives electronic tokens on the player's smart card when cashing out. In another embodiment, the player can receive either cash or electronic tokens when cashing out. The scenario in FIG. 4 assumes that the player initially uses a smart card to deposit tokens into the gaming machine to obtain playing credits.

In step 52, the player inserts the smart card into a particular gaming machine and enters the player's PIN via keypad 48 in FIG. 2. Requiring a PIN is optional.

In step 54, MDC 54 accesses information stored on the smart card to determine the validity of the smart card and to determine whether the player's entered PIN matches the PIN stored on the smart card.

In step 56, all or some of the electronic tokens on the smart card are downloaded to the SAM in the gaming machine. It is up to the casino how many electronic tokens from the smart card are downloaded to the SAM. In one embodiment, all electronic tokens are automatically downloaded to the SAM, and only if this is successful are the credits then counted by the credit counter in the gaming machine and displayed to the player. In effect, the SAM is an electronic hopper which receives the electronic tokens downloaded from the player's smart card and provides the electronic tokens paid out to the smart card. In another embodiment, the player uses the keypad 48 to identify the number of electronic tokens to download to the SAM to provide credits on the gaming machine. Each electronic token may be equivalent to a nickel, a quarter, a dollar, or other monetary unit.

If fewer than all electronic tokens are downloaded to the SAM, the remaining electronic tokens can be automatically reloaded from the smart card, under control of MDC 54, when the credits on the gaming machine fall below a certain limit (e.g., the maximum bet of the gaming machine).

Display 50 on the gaming machine may inform the player of the downloading procedure, the number of electronic tokens in the player's smart card, and any other event.

The transfer of electronic tokens from a player's smart card to the SAM in the gaming machine occurs as follows:

1. Book the amount of electronic tokens to be transferred to a special purse in the MDC memory;
2. Transfer the amount of electronic tokens in the smart card to the SAM by a secure method determined by the smart card operating system in use;
3. If the transfer between the smart card and the SAM is successful, write a transaction log to the SAM memory;
4. Update the credit meter of the gaming machine according to the amount of the MDC purse;
5. Reset the MDC purse to zero;
6. Send the transaction log to the central database;
7. If the database acknowledges the successful storage of the transaction log, delete this log from the SAM memory.

After the transfer of electronic tokens to the SAM, the status of the SAM is checked by the SSC to ensure that number of electronic tokens in the SAM is within the upper and lower limits.

In step 58, it is determined whether the amount in the SAM is over a certain limit X. This upper limit is configurable and, in one embodiment, this limit is 80% of the maximum capacity of the SAM.

In step 60, if it is determined that there is an excess amount in the SAM, electronic tokens are transferred from the SAM to a Super SAM (SSAM) such that the amount in the SAM is reduced down to a configurable default level below the configurable upper limit. This default level may be, for example, equal to the average amount in a conventional coin-operated slot machine hopper. In another embodiment, this default level may be halfway between the upper and lower limits. The Super SAM selected to receive the electronic tokens is determined by the SSC to be an idle Super SAM having the same currency and the same encryption key system as the requesting SAM and which, after fulfilling the request, comes closest to 65% of its capacity.

In step 62, it is determined by the MDC whether the amount in the SAM is below a certain configurable limit Y. This may be, for example, below 20% of the maximum allowable capacity of the SAM.

If it is determined that the amount in the SAM is below this lower configurable limit, then in step 64 the SAM is refilled to the default level by a Super SAM. As described with respect to FIG. 3, this Super SAM is an idle Super SAM having the same currency and the same key system as the requesting SAM and which, after fulfilling the request, comes closest to 35% of its capacity.

Preferably, after each transfer between a player's smart card and the SAM, the status of the SAM is checked to determine whether a transfer of electronic tokens from the SAM to the Super SAM or from the Super SAM to the SAM is required to prevent the SAM from containing tokens over the upper limit or below the lower limit.

In step 66, the player plays the game on the gaming machine, which entails the player making bets and the player winning awards based on, for example, winning symbol combinations. During this time, bet credits and award credits are registered in the appropriate gaming machine meters. The smart card/SAM system is essentially not active at this time unless the player downloads additional funds from the smart card to the SAM if the player's credits run out.

In step 68, it is determined whether the player has cashed out (by the player pressing a cash out button). If yes, then in step 70 all the accumulated credits in the machine (i.e., those counted by a credit counter and displayed to the player) are downloaded from the SAM to the player's smart card using a secure transfer. The status of the SAM is then checked to ensure the number of electronic tokens in the SAM is within the limits.

The transfer of electronic tokens from the gaming machine to the player's smart card is as follows:

1. Book the amount to be transferred to the MDC purse memory;
2. Reset the credit meter of the gaming machine to zero;
3. Transfer the amount of electronic tokens from the SAM to the smart card by the secure method determined by the smart card operating system in use;
4. If the transfer between the smart card and the SAM is successful, write a transaction log to the SAM's memory;
5. Reset the MDC purse memory to zero;
6. Send the transaction log to the central database; and
7. If the database acknowledges the successful storage of the transaction log, delete this log from the SAM.

When there is a problem during the booking process, the transfer amount remains on the MDC purse memory for further examination by authorized casino personnel.

In step 72, the smart card is ejected.

Ultimately, the player presents the smart card to casino personnel or to a terminal. The smart card is then inserted into a card reader, the player's PIN is entered, and the amount on the smart card is converted into cash for payment to the player.

By automatically transferring funds between the SAMs and the Super SAMs, funds are made available by the Super SAMs to any of the SAMs in the various gaming machines. This reduces the amount of smart card money needed by the casino to fund all the SAMs and provides additional benefits as previously described.

Instead of smart cards, other types of cards can be read by the gaming machine's card reader such as magnetic strip cards, bar coded paper tickets, and hybrids. The present system may be used with any such cards or other cashless gaming techniques.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is claimed is:

1. A method comprising:

receiving a smart card in a card reader associated with a gaming machine, the smart card having electronic tokens stored in a first memory;

transferring electronic tokens from the smart card to a second memory internal to a gaming machine, the gaming machine being connected to a communications network; and transferring electronic tokens via the network between a third memory, external to the gaming machine, and the second memory, the third memory not being part of the smart card having the first memory, wherein transferring electronic tokens between the third memory and the second memory comprises transferring electronic tokens from the third memory to the second memory to increase the number of electronic tokens in the second memory to at or above a predetermined lower limit, wherein the transferring of electronic tokens between the third memory and the second memory is initiated and performed automatically to increase the number of electronic tokens in the second memory to at or above the predetermined lower limit and not pursuant to any request by a player to transfer electronic tokens between the third memory and the second memory.

2. The method of claim 1 wherein the card reader forms part of the gaming machine.

3. The method of claim 1 wherein transferring electronic tokens between the third memory and the second memory comprises:

transferring electronic tokens from the second memory to the third memory to reduce the number of electronic tokens in the second memory to at or below a predetermined upper limit, wherein the transferring of electronic tokens from the second memory to the third memory is initiated and performed automatically to reduce the number of electronic tokens in the second memory to at or below the predetermined upper limit and not pursuant to any request by a player to transfer electronic tokens from the second memory to the third memory.

4. The method of claim 1 wherein transferring electronic tokens between the third memory and the second memory maintains the number of electronic tokens in the second memory between an upper limit and a lower limit.

5. The method of claim 1 further comprising:

determining whether the number of electronic tokens in the second memory is above an upper limit and, if so, transferring electronic tokens from the second memory to the third memory to cause the number of electronic tokens in the second memory to be at a desired level, wherein the transferring of electronic tokens from the second memory to the third memory is initiated and performed automatically to cause the number of electronic tokens in the second memory to at the desired level and not pursuant to any request by a player to transfer electronic tokens from the second memory to the third memory.

6. The method of claim 1 further comprising:

automatically determining whether the number of electronic tokens in the second memory is below a lower limit and, if so, transferring electronic tokens from the third memory to the second memory to cause the number of tokens in the second memory to be at a desired level.

7. The method of claim 1 wherein the second memory is a smart card installed in the gaming machine.

8. The method of claim 1 wherein the third memory is a smart card installed in a card reader.

9. The method of claim 1 further comprising:

automatically transferring electronic tokens from the third memory to the second memory when the gaming machine is initially connected to the network.

10. The method of claim 1 wherein the gaming machine having the second memory is one of a plurality of gaming machines connected to the network, each gaming machine having an internal memory, the method further comprising:

transferring electronic tokens between the third memory and an internal memory of any of the gaming machines that has requested a transfer of electronic tokens.

11. The method of claim 1 wherein the external third memory is one of a plurality of external memories, the method further comprising:

selecting from the plurality of external memories one external memory for transferring electronic tokens to the second memory, the one external memory being an idle external memory that has an electronic token content that comes closest to a predetermined level after the transfer of electronic tokens to the second memory.

12. The method of claim 1 wherein the external third memory is one of a plurality of external memories, the method further comprising:

selecting from the plurality of external memories one external memory for receiving electronic tokens from the second memory, the one external memory being an idle external memory that has an electronic token content that comes closest to a predetermined level after the transfer of electronic tokens from the second memory.

13. The method of claim 1 wherein the gaming machine is one of a plurality of gaming machines connected to the network, each gaming machine having an internal memory, and wherein the third memory is one of a plurality of external memories, the method further comprising:

selecting one of the external memories by any of the gaming machines for transferring electronic tokens between a selected external memory and a memory internal to a gaming machine.

14. The method of claim 1 further comprising checking a status of the second memory after each transfer between the second memory and the first memory to determine whether to perform the transferring electronic tokens between the third memory and the second memory.

15. A system for operating gaming machine comprising:

a communications network;

a plurality of gaming machines connected to the network, each gaming machine having an internal memory, each gaming machine having an associated smart card reader;

at least one smart card installed in a first card reader external to the gaming machine and connected to the network; and at least one processor for transferring electronic tokens between any of the memories internal to the gaming machines and the at least one smart card installed in a first card reader external to the gaming machine to increase the number of electronic tokens in the internal memory to at or above a predetermined lower limit, wherein the transferring of electronic tokens between any of the memories internal to the gaming machines and the at least one smart card installed in the first card reader is initiated and performed automatically to increase the number of electronic tokens in the internal memory to at or above the predetermined lower limit and not pursuant to any request by a player to transfer electronic tokens between any of the memories internal to the gaming machines and the at least one smart card installed in the first card reader.

16. The system of claim 15 further comprising a computer connected to the network for obtaining data on the transferring of electronic tokens between any of the memories internal to the gaming machines and the at least one smart card installed in a first card reader external to to gaming machine.

17. The system of claim 15 wherein the internal memory in each of the gaming machines is a smart card.

18. A gaming machine comprising:

a smart card reader for communicating with a smart card having electronic tokens stored in a first memory;

a second memory internal to a gaming machine for receiving electronic tokens from a smart card in the smart card reader; and a processor for transferring electronic tokens, via a communications network, between the second memory and a third memory external to the gaming machine to increase the number of electronic tokens in the second memory to at or above a predetermined lower limit, the third memory not being part of the smart card having the first memory, wherein the transferring of electronic tokens between the second memory and the third memory is initiated and performed automatically to increase the number of electronic tokens in the second memory to at or above the predetermined lower limit and not pursuant to any request by a player to transfer electronic tokens between the second memory and the third memory.

19. The machine of claim 18 wherein the processor maintains the number of electronic tokens in the second memory between an upper limit and a lower limit.

20. The machine of claim 18 wherein the second memory and the third memory are smart cards.

21. A method comprising:

receiving a smart card in a card reader associated with a gaming machine, the smart card having electronic tokens stored in a first memory;

transferring electronic tokens from the smart card to a second memory internal to a gaming machine, the gaming machine being connected to a communications network; and transferring electronic tokens via the network between a third memory, external to the gaming machine, and the second memory, the third memory not being part of the smart card having the first memory, wherein transferring electronic tokens between the third memory and the second memory comprises transferring electronic tokens from the second memory to the third memory to reduce the number of electronic tokens in the second memory to at or below a predetermined upper limit, wherein the transferring of electronic tokens between the third memory and the second memory is initiated and performed automatically to reduce the number of electronic tokens in the second memory to at or below the predetermined upper limit and not pursuant to any request by a player to transfer electronic tokens between the third memory and the second memory.

* * * * *